United States Patent [19]
Balling

[11] Patent Number: 6,009,276
[45] Date of Patent: Dec. 28, 1999

[54] ONE-TIME-USE CAMERA WITH TEMPORARY MOTOR DEFEAT DURING CAMERA MANUFACTURE

[75] Inventor: Edward N. Balling, Rochester, N.Y.

[73] Assignee: Eastman Kodak Company, Rochester, N.Y.

[21] Appl. No.: 09/061,629

[22] Filed: Apr. 16, 1998

[51] Int. Cl.⁶ .................................................. G03B 17/02
[52] U.S. Cl. ................................ 396/6; 396/535; 396/395
[58] Field of Search ............................... 396/6, 535, 439, 396/452, 389, 395, 411, 418; 73/1.42, 1.56

[56] References Cited

U.S. PATENT DOCUMENTS

| | | |
|---|---|---|
| 3,774,514 | 11/1973 | Okamoto et al. . |
| 3,875,580 | 4/1975 | Watanabe et al. . |
| 3,956,762 | 5/1976 | Miyamoto . |
| 4,135,797 | 1/1979 | Ohmura et al. . |
| 4,178,086 | 12/1979 | Date et al. . |
| 4,229,955 | 10/1980 | Caralli et al. . |
| 4,249,816 | 2/1981 | Suzuki et al. . |
| 4,275,955 | 6/1981 | Kitai et al. . |
| 4,334,752 | 6/1982 | Johnson et al. .......................... 396/535 |
| 4,361,387 | 11/1982 | Cloutier . |
| 5,337,099 | 8/1994 | Tasaka et al. ................................ 396/6 |
| 5,608,478 | 3/1997 | Kamoda . |
| 5,669,017 | 9/1997 | Yamashina et al. .......................... 396/6 |
| 5,752,085 | 5/1998 | Cloutier et al. .............................. 396/6 |

Primary Examiner—Safet Metjahic
Assistant Examiner—J. K. Han
Attorney, Agent, or Firm—Roger A. Fields

[57] ABSTRACT

A one-time-use camera including a main body part with a cartridge receiving chamber for a film cartridge and a film roll chamber for an unexposed filmstrip that is prewound from the film cartridge into an unexposed film roll, a cover part for the main body part, a shutter mechanism opened and closed to expose successive sections of the filmstrip, and a film winding motor operable to wind each exposed section of the filmstrip into the film cartridge when the shutter mechanism is closed, is characterized in that the cover part has a temporary motor defeat that prevents operation of the film winding motor when the shutter mechanism is closed, to allow the shutter mechanism to be tested without having to operate the film winding motor, but is removable from the cover part to allow the film winding motor to be operated.

8 Claims, 11 Drawing Sheets

ONE-TIME-USE CAMERA WITH TEMPORARY MOTOR DEFEAT DURING CAMERA MANUFACTURE

CROSS-REFERENCE TO RELATED APPLICATION

Reference is made to commonly assigned copending application Ser. No. 09/054,291 entitled ONE-TIME-USE CAMERA WITH MULTI-ADAPTER FIXTURE FOR MOTOR AND SELF TIMER, and filed Apr. 2, 1998 in the name of Edward N. Balling.

The cross-referenced application is incorporated in this application.

1. Field of the Invention

The invention relates generally to the field of photography, and in particular to motorized cameras. More specifically, the invention relates to a one-time-use camera with a film winding motor that is prevented from operation when a shutter mechanism is tested during camera manufacture.

2. Background of the Invention

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Problem

Typically, during original camera manufacture or used camera remanufacture, a fresh cartridge is placed in the cartridge receiving chamber and most of the unexposed filmstrip is prewound from the film cartridge into the other chamber. This is often done in the dark with the rear cover part separated from the main body part.

If it is decided to include a film winding motor instead of the manual thumbwheel in a one-time-use camera that has an electronic flash, the film winding motor preferably should not be operated when the shutter mechanism is tested in the dark with the rear cover part separated from the main body part. The reason for this is that operation of the film winding motor causes the electronic flash to be charged (because the motor and the flash have some common circuitry), which in turn causes a flash ready light to glow and possibly fog the unexposed filmstrip. Thus, some means or step must be found for delaying operation of the film winding motor until the rear cover part has been connected to the main body part to light-tightly shield the unexposed filmstrip.

SUMMARY OF THE INVENTION

A one-time-use camera comprising a main body part with a cartridge receiving chamber for a film cartridge and a film roll chamber for an unexposed filmstrip that is prewound from the film cartridge into an unexposed film roll, a cover part for the main body part, a shutter mechanism opened and closed to expose successive sections of the filmstrip, and a film winding motor operable to wind each exposed section of the filmstrip into the film cartridge when the shutter mechanism is closed, is characterized in that:

the cover part has a temporary motor defeat that prevents operation of the film winding motor when the shutter mechanism is closed, to allow the shutter mechanism to be tested without having to operate the film winding motor, but is removable from the cover part to allow the film winding motor to be operated.

A method of testing a shutter mechanism in a one-time-use camera without having to operate a film winding motor in the camera, comprises the steps:

positioning a temporary motor defeat in the camera to prevent operation of the film winding motor, to allow the shutter mechanism to be tested without having to operate the film winding motor; and withdrawing the temporary motor defeat from a hole in a cover part of the camera to allow the film winding motor to be operated.

DETAILED DESCRIPTION OF THE INVENTION

Figure 1:
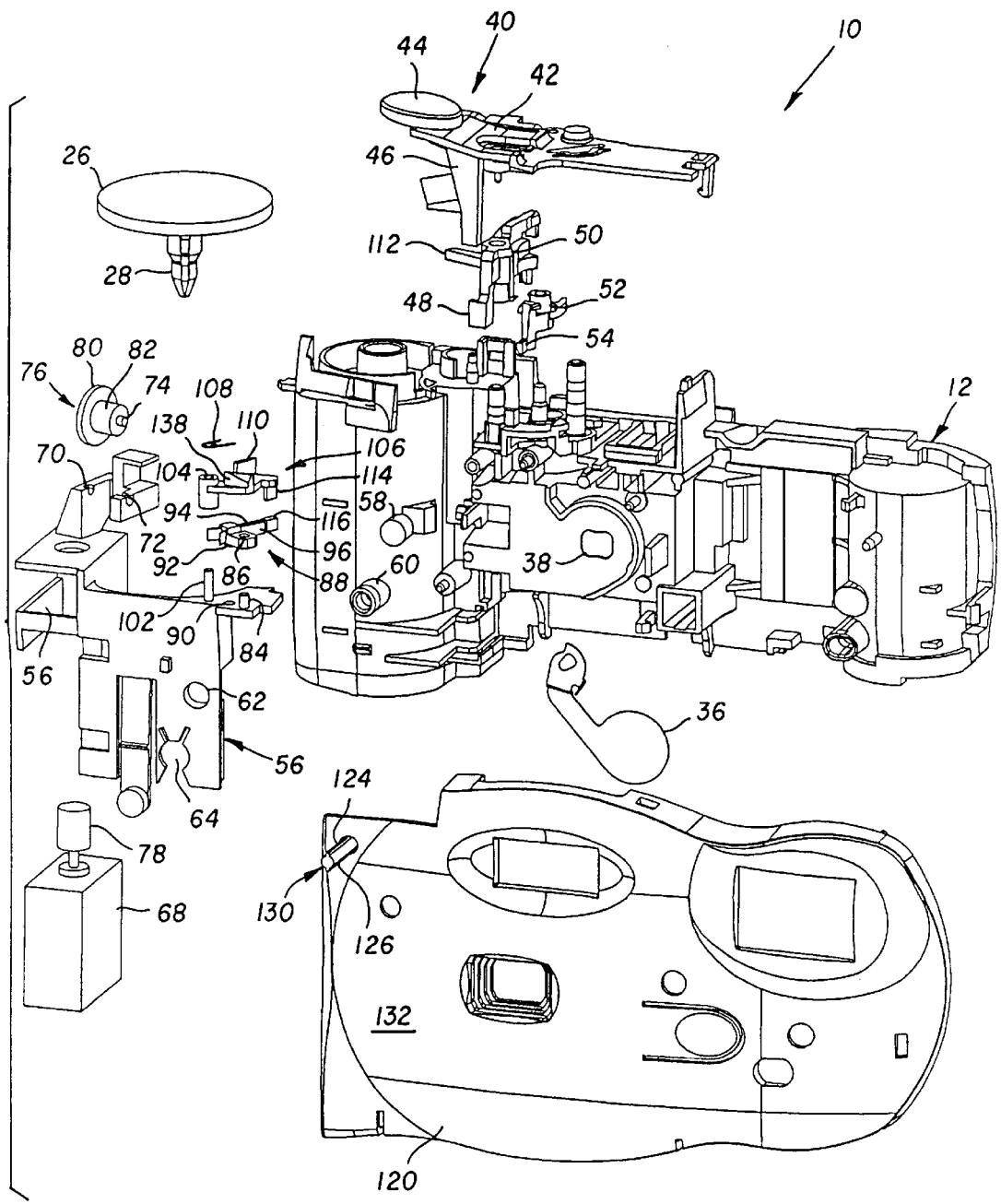
FIG. 1 is an exploded front perspective view of a one-time-use camera with a film winding motor, according to a preferred embodiment of the invention.

The invention is disclosed as being embodied preferably in a one-time-use camera with an electronic flash. Because the features of a one-time-use camera with an electronic flash are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 partially show a one-time use camera 10 including an opaque main body part 12. The main body part 12 has a rearwardly open cartridge receiving chamber 14 for a known "Advanced Photo System" film cartridge 16 and a rearwardly open film roll or film supply chamber 18 for an unexposed film roll 20. A backframe opening 22 is located between the cartridge receiving and film roll (film supply) chambers 16 and 18, for exposing successive sections of a filmstrip 24 initially stored on the unexposed film roll 18 within the film roll chamber 18. A film winding ring gear 26 is rotatably supported on the main body part 12, with a depending coaxial stem 28 of the film winding ring gear in coaxial engagement with a protruding end of the film spool (not shown) in the film cartridge 16 within the cartridge receiving chamber 14. Winding rotation of the film winding ring gear 26 (counter-clockwise in FIG. 5) similarly rotates the film spool to wind each exposed section of the filmstrip 24 into the film cartridge 16. A known exposure counter 30 provides a current count of the film sections that remain to be exposed. A known metering sprocket 32 rotatably supported on the main body part 12 is rotated in engagement with the filmstrip 24 at respective film perforations 34, each time an exposed section of the filmstrip is wound into the film cartridge 16, to decrement the exposure counter 30 to its next lower-numbered setting. Although not shown, a known electrical flash is connected to the main body part 12 and to the positive and negative terminals of a battery.

A known shutter blade 36, shown only in FIG. 1, is pivotally supported on the main body part 12 for pivotal opening and closing movement to momentarily uncover and then recover a front exposure opening 38 in the main body part 12, to allow ambient light into the backframe opening 22 to expose each film section. A torsion return spring (not shown) urges the shutter blade 36 to recover the front exposure opening 38. Opening movement of the shutter blade 36 would be clockwise in FIG. 1, and closing movement of the shutter blade would be counter-clockwise in FIG. 1.

Figure 2:
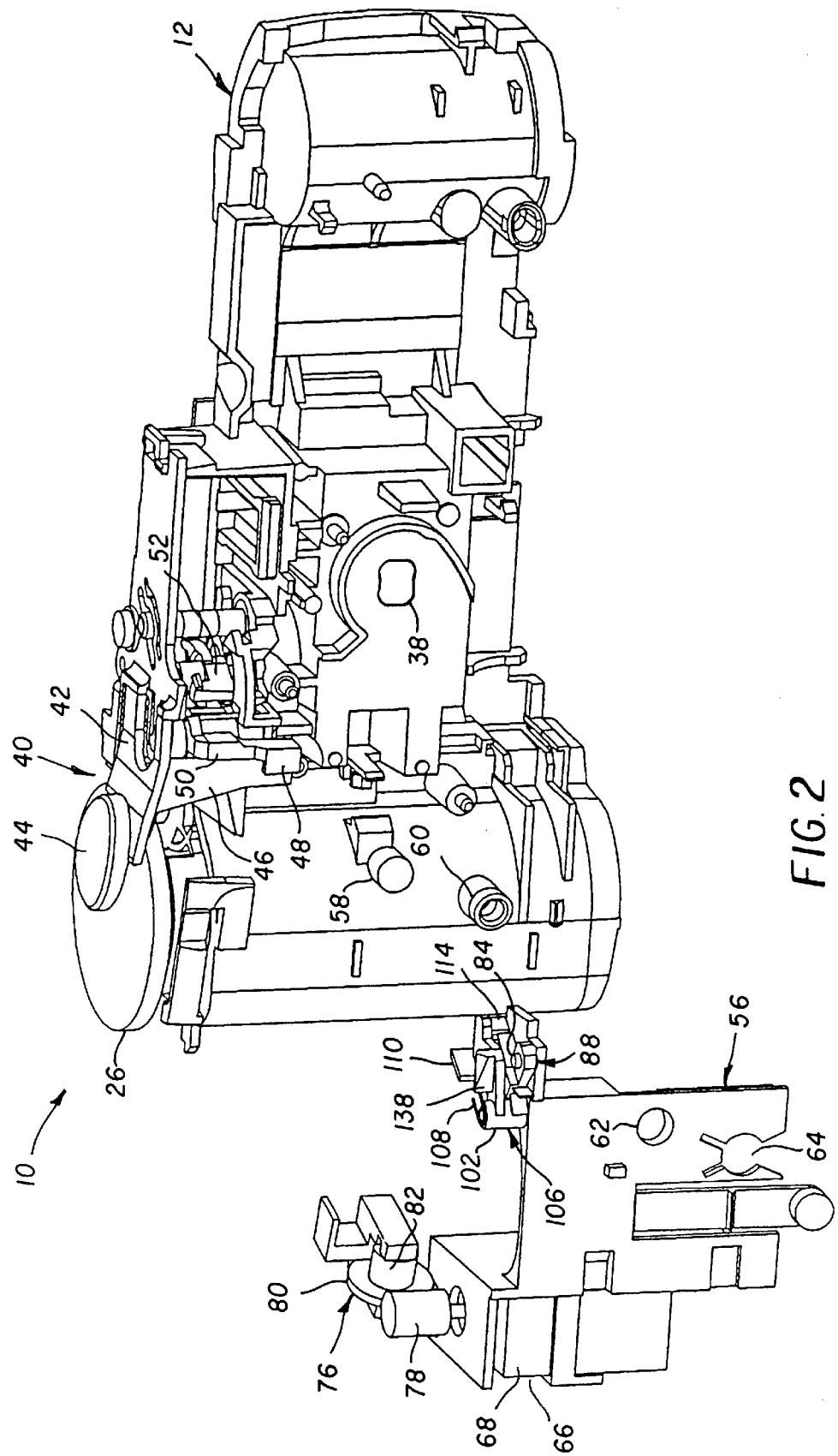
FIG. 2 is a partially assembled front perspective view of the one-time-use camera, showing a mount including the film winding motor, a motor on/off switch and a switch actuator exploded from a main body part.
Figure 3:
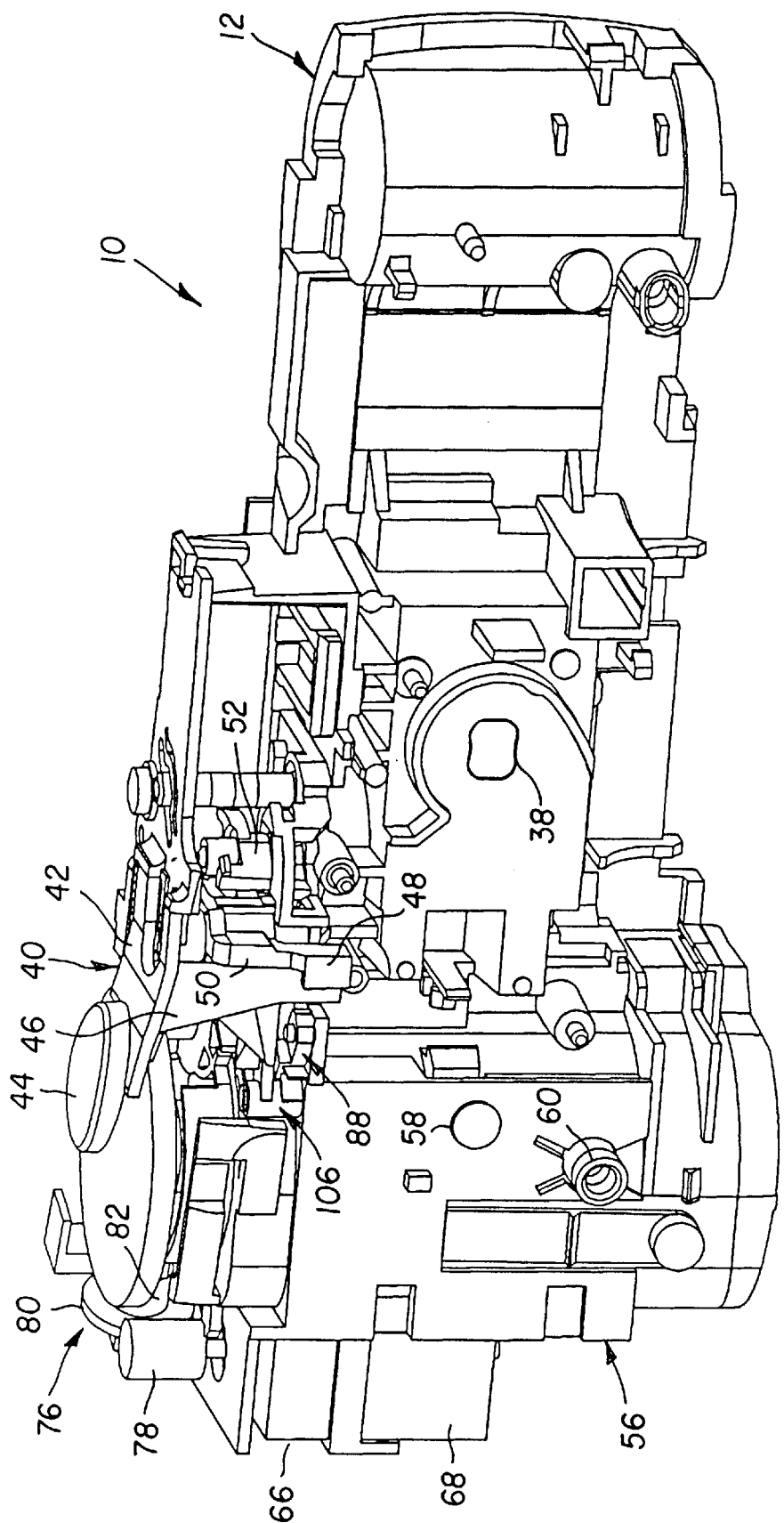
FIG. 3 is an assembled front perspective view of the one-time-use camera similar to FIG. 2.
Figure 6:
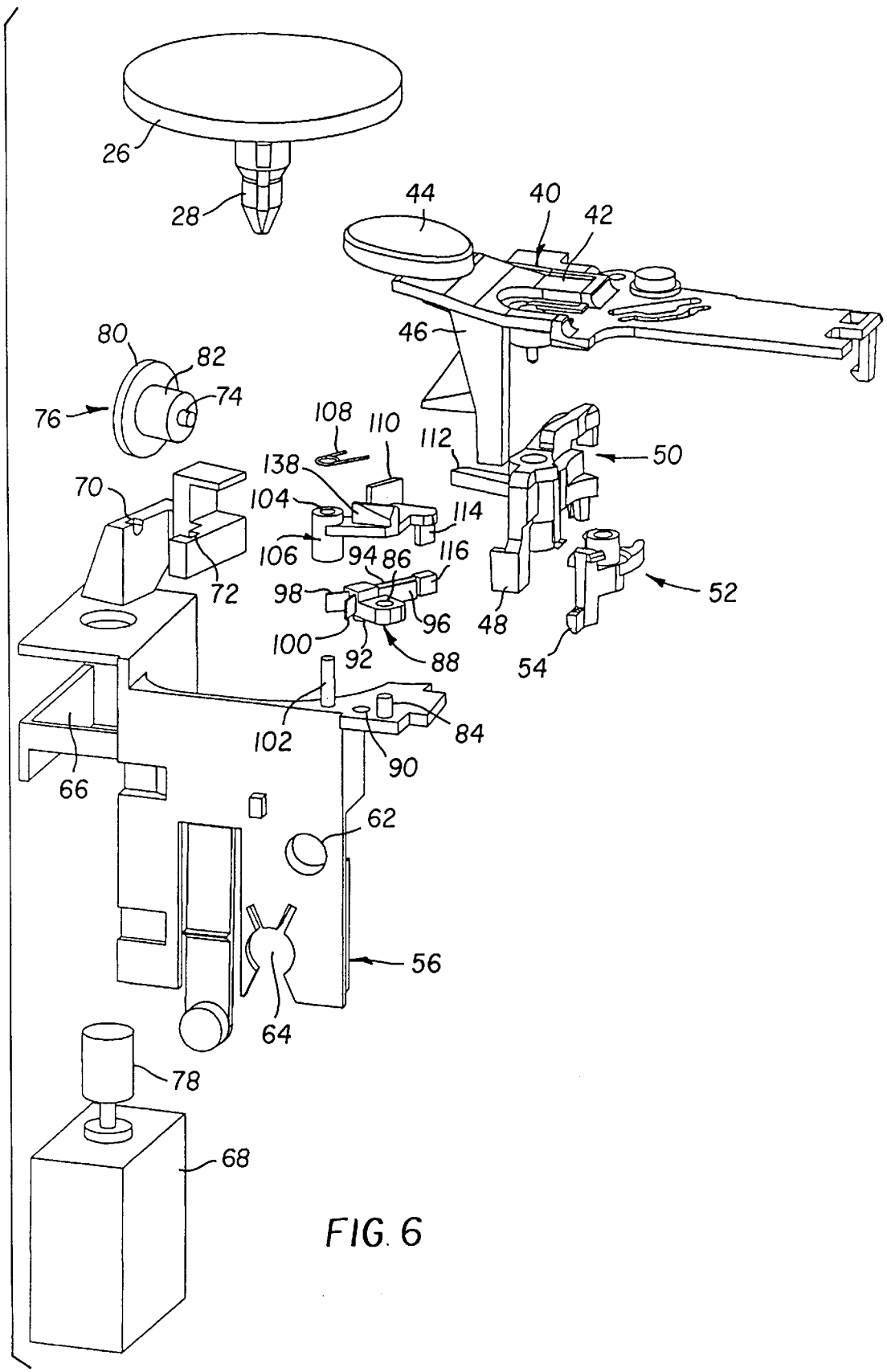
FIG. 6 is an exploded front perspective view of the mount, the film winding motor, the motor on/off switch, the switch actuator, a shutter release component, a metering lever and a high energy lever.
Figure 7:
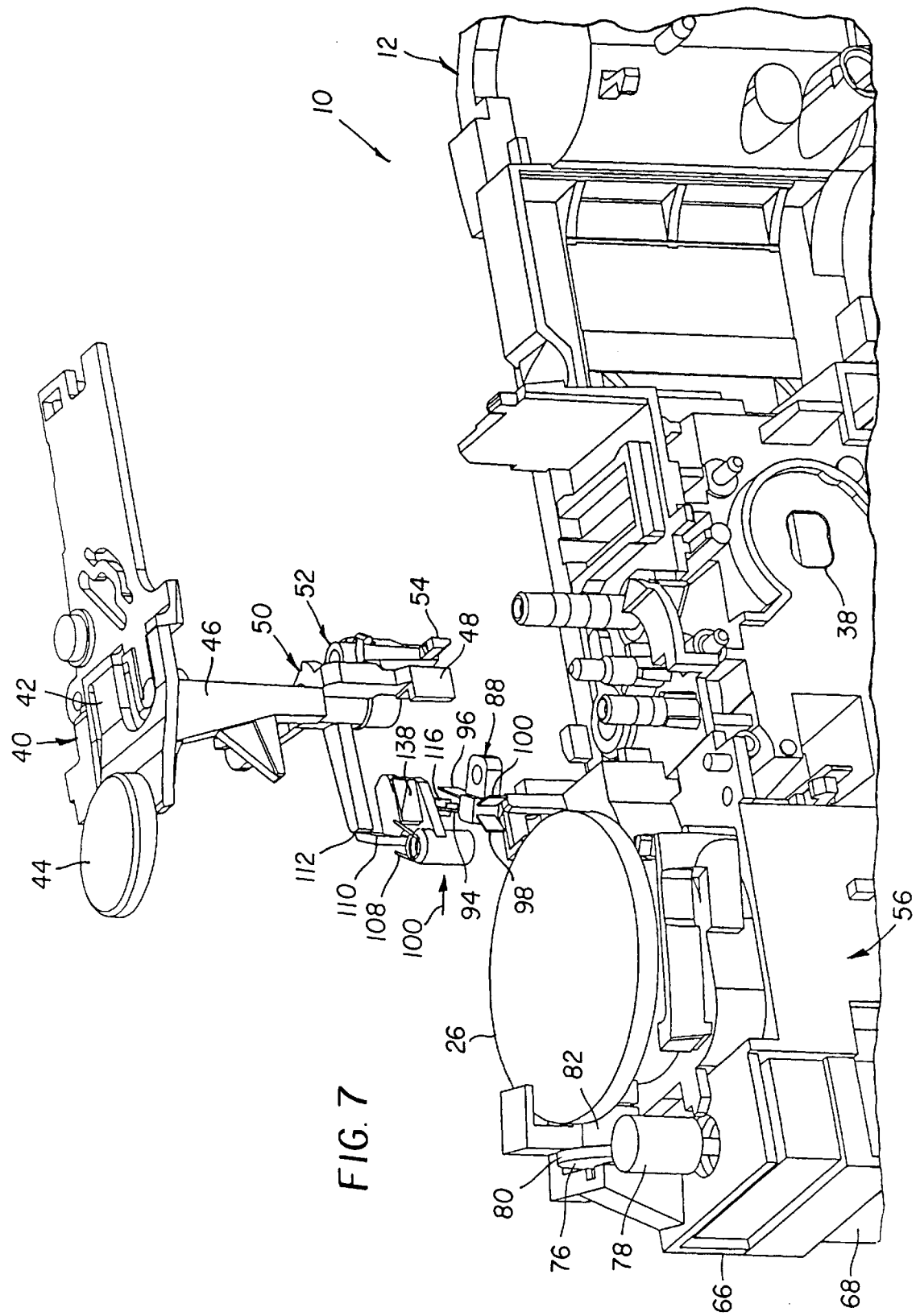
FIG. 7 is an exploded front perspective view of the main body part with the motor on/off switch, the switch actuator, the shutter release component, the metering lever and the high energy lever exploded from the main body part.
Figure 8:
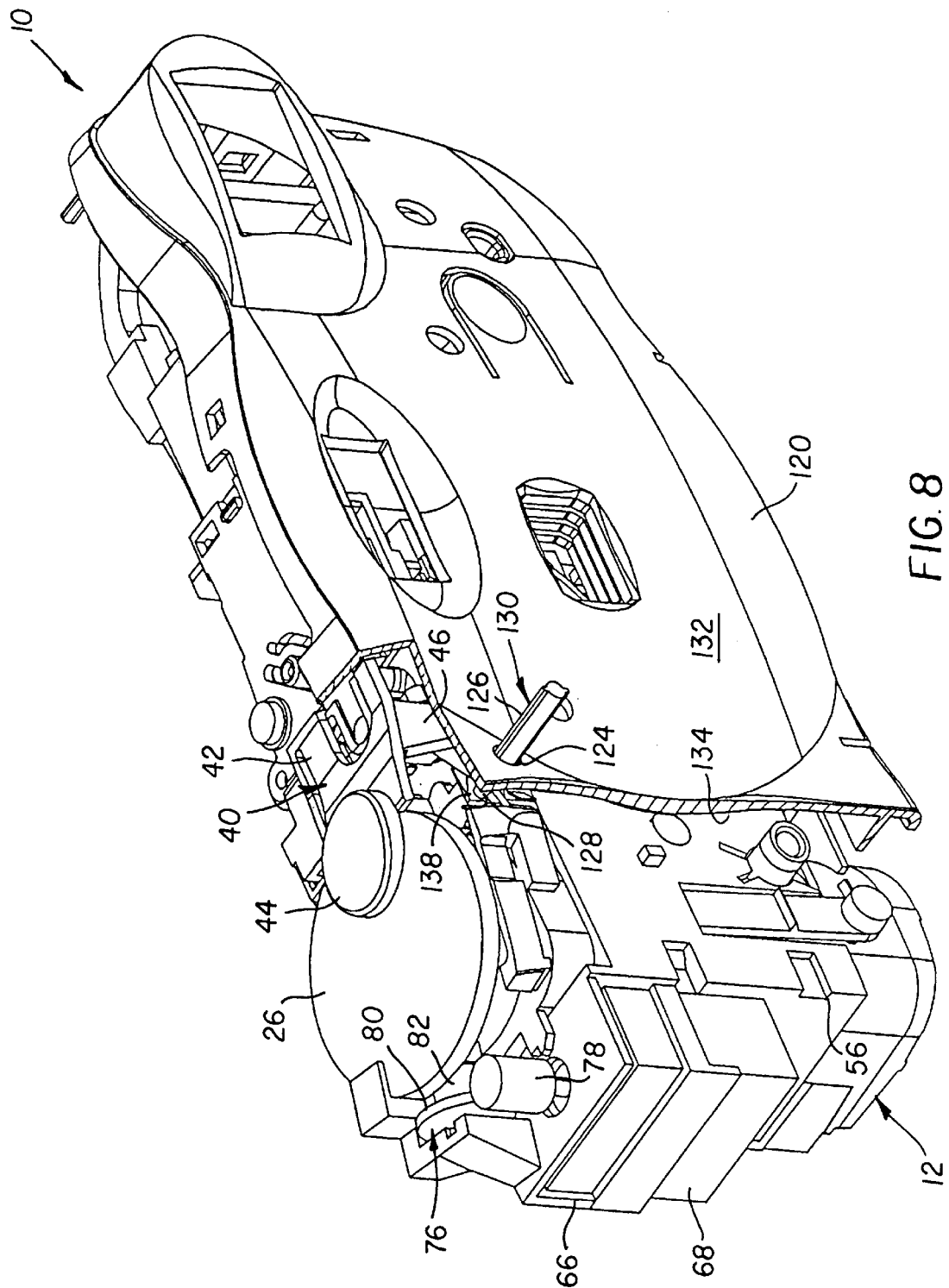
FIG. 8 is an assembled front perspective view of the main body part and a front cover part that has a motor defeat pin.
Figure 9:
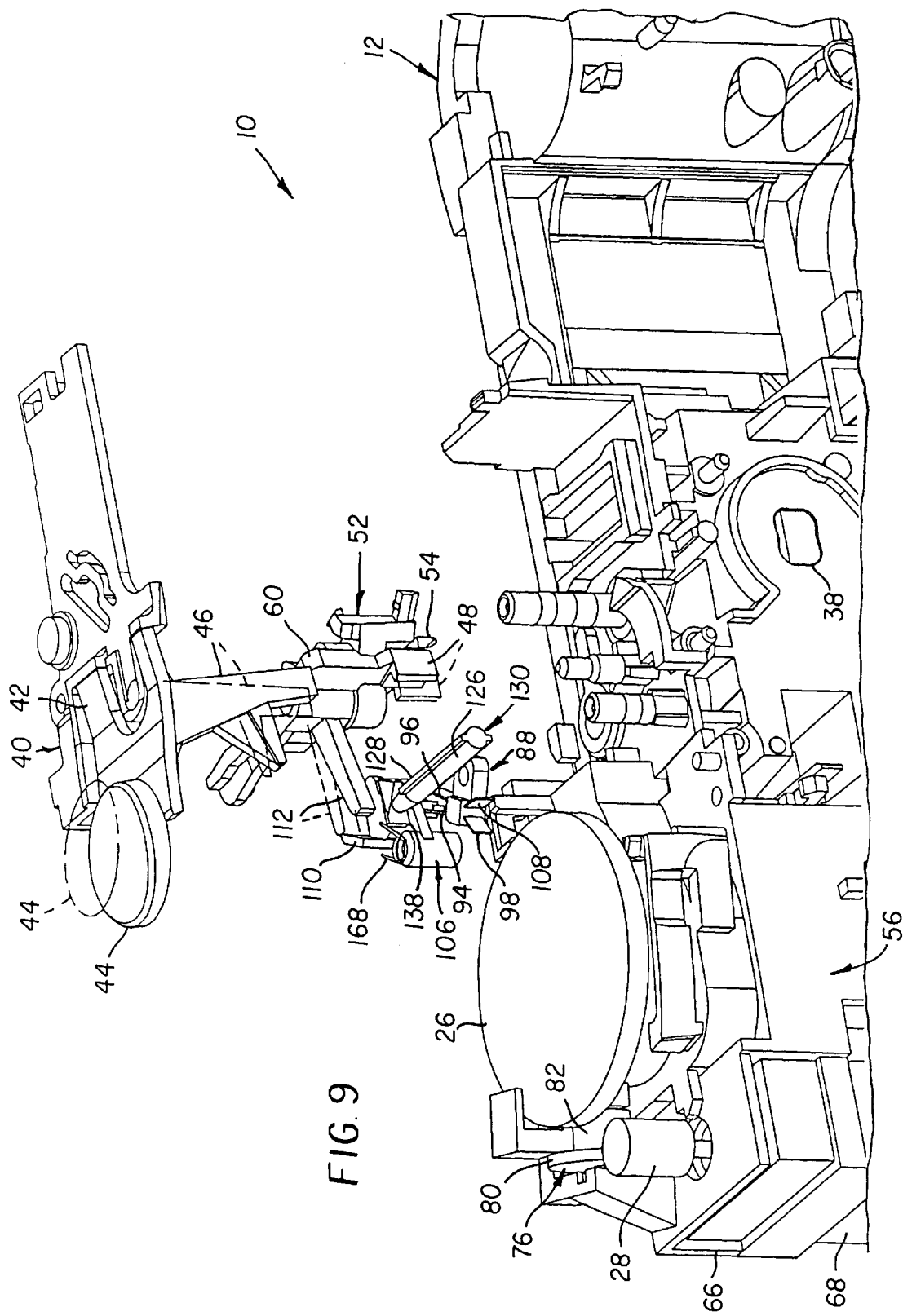
FIG. 9 is an exploded front perspective view similar to FIG. 7, but with the addition of the motor defeat pin.

A shutter release component 40, shown in FIGS. 1 and 6, is secured to the main body part 12 and has a resilient cantilevered beam 42 with a free end that is a manually depressible shutter release button 44. An actuating finger 46 depends from the cantilevered beam 42 to extend behind a right-angled tab 48 on a known metering lever 50. The metering lever 50 is pivotally supported on the main body part 12 and is spring-urged against a known spring-driven high energy lever 52 that is pivotally supported on the main body part. In a metered position, the metering lever 50 engages the high energy lever 52 to hold the high energy lever in a cocked position. FIGS. 2, 3, and 7 show the metering lever 50 in its metered position and the high energy lever 52 in its cocked position. When the shutter release button 44 is manually depressed, the cantilevered beam 42 is bent (beginning at the shutter release button) to make the actuating finger 46 swing counter-clockwise in FIG. 9 and in turn pivot the metering lever 50 counter-clockwise in FIG. 9 from its metered position to a demetered position. When the imetering lever 50 is initially pivoted counter-clockwise from the metered position, it releases the high energy lever 52 from its cocked position. The high energy lever 52 is then spring pivoted counter-clockwise in FIG. 9 to swing a whacker 54 on the high energy lever to briefly strike the shutter blade 36, to pivot the shutter blade open to uncover the front exposure opening 38. The torsion return spring (not shown) for the shutter blade 36 pivots the shutter blade closed to recover the front exposure opening 38. The high energy lever 52 is shown in FIG. 9 pivoted counter-clockwise from its cocked position to a relaxed terminal position.

As shown in FIGS. 1–3 and 6, a single-piece mount 56 can be secured to the main body part 12, adjacent the cartridge receiving chamber 14, by means of two integral projections 58 and 60 on the main body part that extend through respective holes 62 and 64 in the mount. The mount 56 has an open pocket 66 for receiving a direct current film winding motor 68 and a pair of aligned cradle slots 70 and 72 for receiving respective coaxial shaft ends 74 (only one shown) to rotatably support a combination gear 76. A worm gear 78, which the film winding motor 66 directly rotates, meshes with an annular gear 80 of the combination gear 76 to in turn rotate the combination gear. A pinion gear 82 of the combination gear 76 meshes with the film winding ring gear 26 to windingly rotate that gear to in turn rotate the film spool (not shown) in the film cartridge 16 within the cartridge receiving chamber 14 to wind each exposed section of the filmstrip 24 into the film cartridge. See FIG. 5.

As shown in FIGS. 1, 3 and 6, the mount 56 has an integral projection 84 that is received in a hole 86 in a motor on/off switch 88 and a hole 90 that receives a projection 92 on the underside of the motor on/off switch to secure the motor on/off switch to the mount. The motor on/off switch 88 has a resilient switch contact 94 that is inherently urged against a stationary switch contact 96 to close the motor on/off switch. Separation of the resilient switch contact 94 from the stationary switch contact 96 opens the motor on/off switch 88. The motor on/off switch 88 has one lead 98 connected to the electronic flash (not shown) and another lead 100 connected to the film advance motor 68. The film advance motor 68 is connected to the electronic flash and to the motor on/off switch 88. When the motor on/off switch 88 is closed, the film advance motor 68 is powered on and the electronic flash is recharged. A known flash ready light (not shown) is turned on to visibly indicate that the electronic flash is suitably charged. When the motor on/off switch 88 is opened, the film advance motor 68 is deactivated.

As shown in FIGS. 1, 6 and 7, the mount 56 has an integral projection 102 that is received in a hole 104 in a switch actuator 106 to pivotally support the switch actuator on the mount. A torsion spring 108 biases the switch actuator 106 clockwise in FIG. 6 to hold a follower wall 10 on the switch actuator continuously against a cam surface 112 on the metering lever 34. A tab 114 on the underside of the switch actuator 106 abuts a block-like free end 116 of the resilient switch contact 94 to hold the resilient switch contact separated from the stationary switch contact 96, to maintain the motor on/off switch 88 open.

Figure 4:
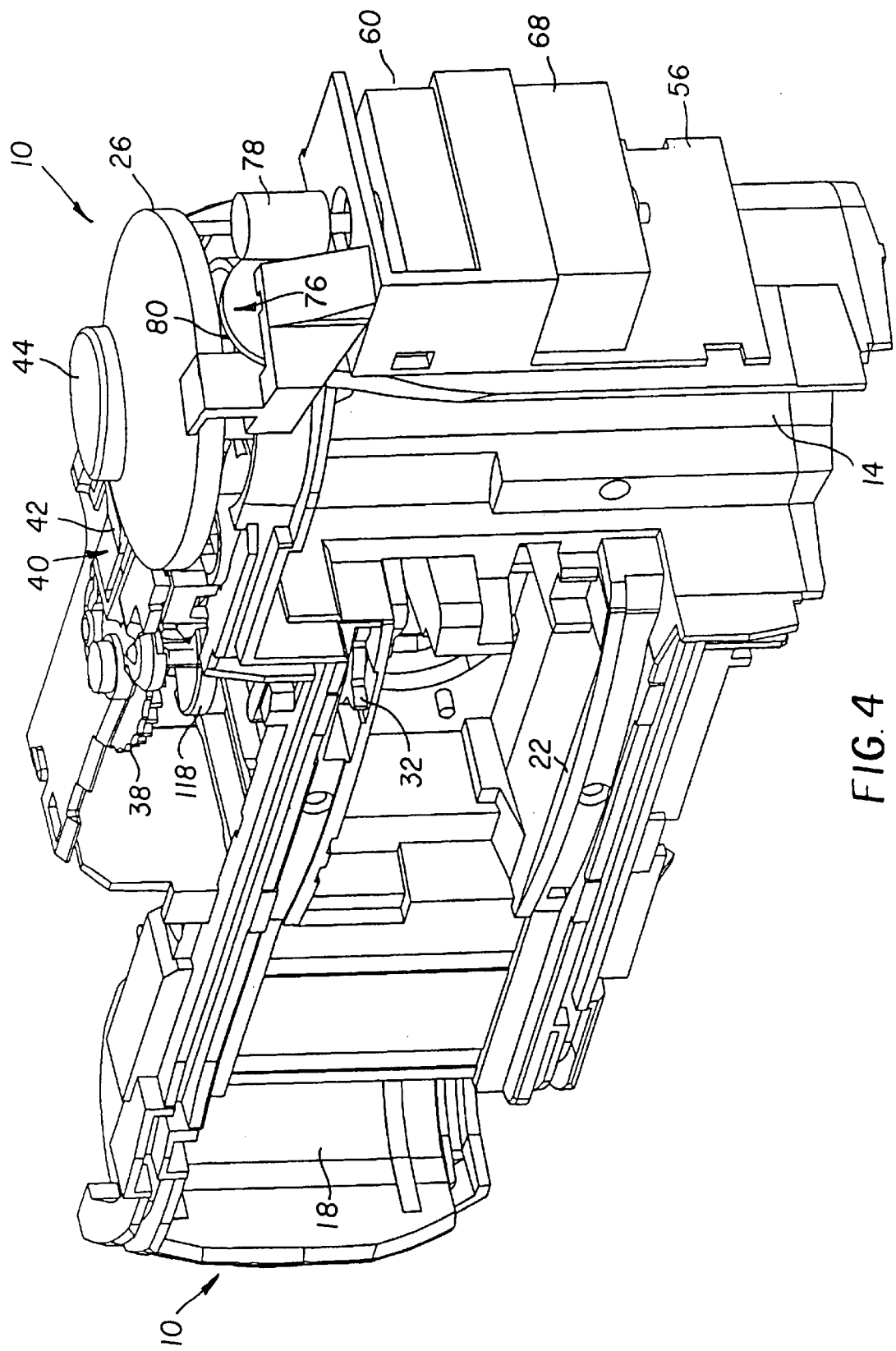
FIG. 4 is an assembled rear perspective view of the one-time-use camera, showing empty cartridge receiving and film roll chambers in the main body part.
Figure 5:
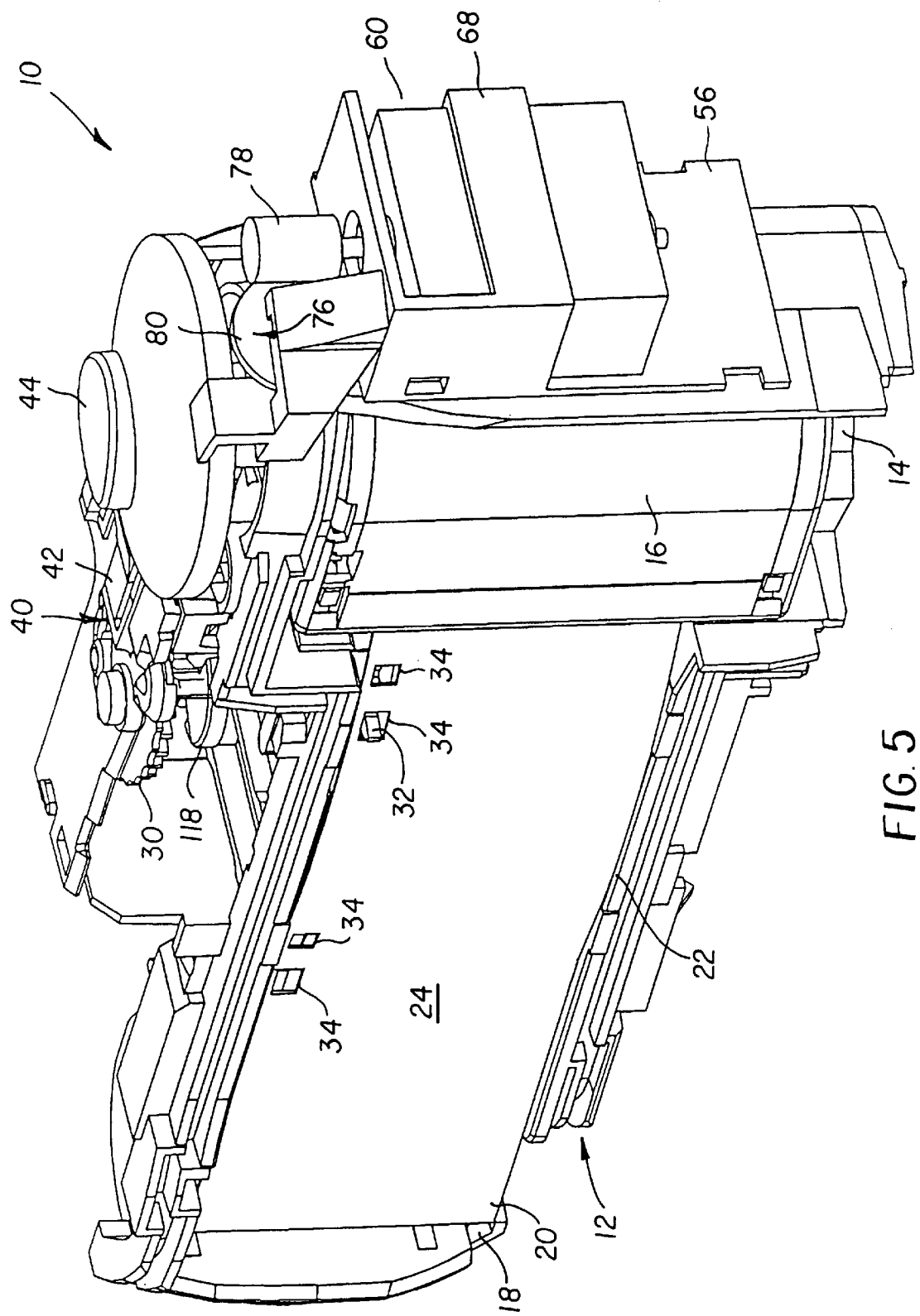
FIG. 5 is an assembled rear perspective view of the one-time-use camera, showing an unexposed filmstrip being prewound from a film cartridge in the cartridge receiving chamber into an unexposed film roll in the film roll chamber.

When the metering lever 34 is pivoted counter-clockwise in FIGS. 6 and 7 from its metered position, and the shutter blade 36 has been closed to recover the front exposure aperture 38, the cam surface 112 on the metering lever moves in contact with the follower wall 10 of the switch actuator 106 to pivot the switch actuator clockwise in FIG. 6 to retract the tab 114 on the switch actuator from against the block-like free end 116 of the resilient switch contact 94. This allows the resilient switch contact 94 to swing against the stationary switch contact 96 to close the motor on/off switch 88 to in turn power on the film advance motor 68 (and recharge the electronic flash). Consequently, the film winding ring gear 26 is windingly rotated to rotate the film spool (not shown) in the film cartridge 16 within the cartridge receiving chamber 14 to wind another exposed section of the filmstrip 24 into the film cartridge. The resulting film movement rotates the metering sprocket 32 a half revolution (180°) to similarly rotate a metering cam 118 which is coaxially fixed to the metering sprocket and is shown in FIGS. 4 and 5. The metering cam 118 in turn pivots the high energy lever 52 clockwise in FIG. 9 from its relaxed position back to its cocked position. Since the metering lever 50 is spring urged against the high energy lever 52, the metering lever is pivoted clockwise in FIG. 9 from its demetered position back to its metered position. When the metering lever 34 is pivoted clockwise back to its imetered position, the cam surface 112 on the metering lever moves in contact with the wall 110 of the switch actuator 106 to pivot the switch actuator counter-clockwise in FIG. 9 and return the tab 114 on the switch actuator against the block-like free end 116 of the resilient switch contact 106. The resilient switch contact 94 is separated from the stationary switch contact 96 to re-open the motor on/off switch 88 and deactivate the film advance motor 68.

Figure 11:
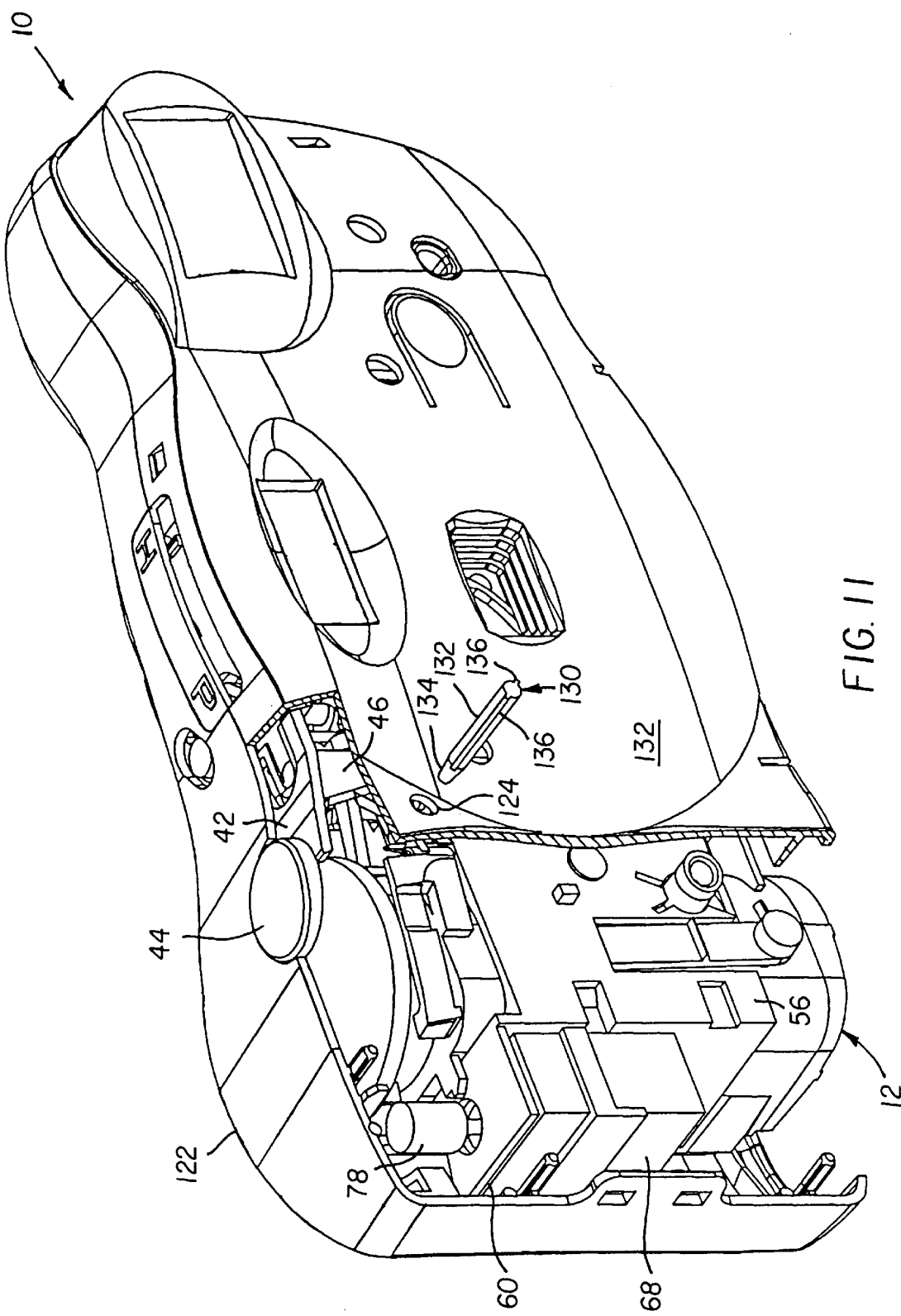
FIG. 11 is an assembled front perspective view similar to FIG. 8, but with the motor defeat pin removed from the front cover part.

As shown in FIGS. 1 and 11, a pair of opaque front and rear cover parts 120 and 122 house the main body part 12 between them. The rear cover part 122 light-tightly shields the filmstrip 24.

Figure 10:
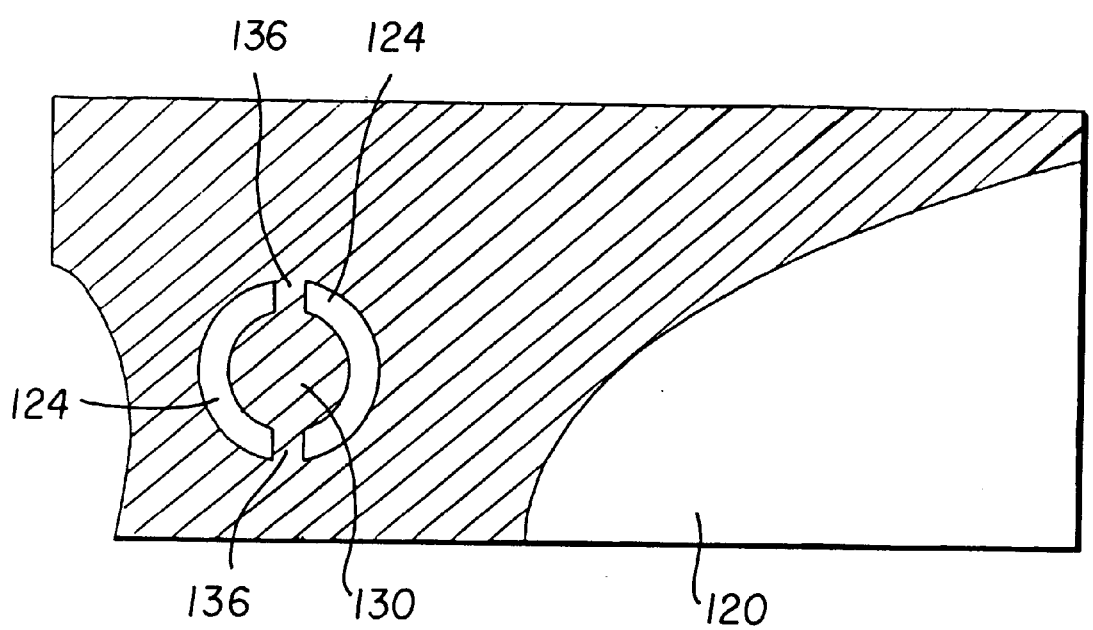
FIG. 10 is a partial sectional view of the front cover part with the motor defeat pin.

During original camera manufacture or used camera remanufacture, it is desirable to test the shutter operation. This test is done after the unexposed filmstrip 24 has been prewound from the film cartridge 16 within the cartridge receiving chamber 14 into the unexposed film roll 20 within the film roll chamber 18, and with the rear cover part 122 separated from the main body part 12 as shown in FIG. 5. Therefore, the test must be done in the dark. If the film winding motor 68 is allowed to be powered on, the electronic flash will be recharged to in turn cause the flash ready light (not shown) to glow and fog the unexposed filmstrip 24. Thus, some means is necessary for delaying operation of the film winding motor 68 until the rear cover part 122 has been connected to the main body part 12 to light-tightly shield the unexposed filmstrip 24. As shown in FIGS. 8–11, the front cover part 120 has a hole 124 from which respective outer and inner portions 126 and 128 of a motor defeat pin 130 longitudinally project at outer and inner sides 132 and 134 of the front cover part. As shown in FIG. 10, the motor defeat pin 130 has opposite thin weakened connections 136 with the front cover part 120, within the hole 124. When the front cover part 120 is connected to the main body part 12, the inner pin portion 128 is held against an angled surface 138 of the switch actuator 106. This prevents the switch actuator 106 from being pivoted clockwise in FIG. 9 to retract the tab 114 on the switch actuator from against the block-like free end 116 of the resilient switch contact 94, when the metering lever 34 is pivoted counter-clockwise in FIG. 9 from its metered position. Consequently, the motor on/off switch 88 remains closed to prevent the film advance motor 68 from being powered on and to prevent the electronic flash from being charged. After the rear cover part 122 is connected to the main body part 12 to light-tightly shield the unexposed filmstrip 24, the outer pin portion 126 is grasped and the motor defeat pin 130 is pulled from the hole 124, initially tearing the opposite weakened connections 136 and retracting the inner pin portion 128 from against the angled surface 138 of the switch actuator 106. This allows the torsion spring 108 to pivot the switch actuator 106 clockwise in FIG. 6 to retract the tab 114 on the switch actuator from against the block-like free end 116 of the resilient switch contact 94, which in turn allows the resilient switch contact 94 to swing against the stationary switch contact 96 to close the motor on/off switch 88 and power on the film advance motor 68 and charge the electronic flash. Then, the film winding ring gear 26 is windingly rotated to rotate the film spool (not shown) in the film cartridge 16 within the cartridge receiving chamber 14 to wind a first available section of the filmstrip 24 into the film cartridge. Since the rear cover part 122 is connected to the main body part 12, the filmstrip 24 will not be fogged when the flash ready light is turned on.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. cartridge receiving chamber
16. film cartridge
18. film roll (film supply) chamber
20. unexposed film roll
22. backframe opening
24. filmstrip
26. film winding ring gear
28. coaxial stem
30. exposure counter
32. metering sprocket
34. film perforations
36. shutter blade
38. front exposure opening
40. shutter release component
42. cantilevered beam
44. shutter release button
46. actuating finger
48. right-angled tab
50. metering lever
52. high energy lever
54. whacker
56. mount
58. projection
60. projection 62. hole
64. hole
66. pocket
68. film winding motor
70. cradle slot
72. cradle slot
74. shaft ends
76. combination gear
78. worm gear
80. annular gear
82. pinion gear
84. projection
86. hole
88. motor on/off switch
90. hole
92. projection
94. resilient switch contact
96. stationary switch contact
98. lead
100. lead
102. projection
104. hole
106. switch actuator
108. torsion spring
110. follower wall
112. cam surface
114. tab
116. block-like free end
118. metering cam
120. front cover part
122. rear cover part
124. hole
126. outer pin portion
128. inner pin portion
130. motor defeat pin
132. outer side
134. inner side
136. weakened connections
138. angled surface

What is claimed is:

1. A one-time camera comprising a main body part with a cartridge receiving chamber for a film cartridge and a film roll chamber for an unexposed filmstrip that is prewound from the film cartridge into an unexposed film roll, a cover part for said main body part, a shutter mechanism opened and closed to expose successive sections of the filmstrip, and a film winding motor operable to wind each exposed section of the filmstrip into the film cartridge when said shutter mechanism is closed, is characterized in that:

said cover part has a temporary motor defeat that prevents operation of said film winding motor when said shutter mechanism is closed, to allow said shutter mechanism to be tested without having to operate said film winding motor, but is removable from said cover part to allow said film winding motor to be operated; and a motor on/off switch is actuated to operate said film winding motor and is actuated to prevent operation of said film winding motor, and said temporary motor defeat includes a protuberance that projects from an inner side of said cover part to maintain said motor on/off switch actuated to prevent operation of said film winding motor.

2. A one-time-use camera as recited in claim 1, wherein said temporary motor defeat has a weakened connection with said cover part that permits said temporary motor defeat to be separated from said cover part.

3. A one-time-use camera as recited in claim 1, wherein said cover part has a hole, and said protuberance projects from said hole at an outer side of said main body part to permit the protuberance to be grasped to be removed from the hole and discarded.

4. A one-time-use camera comprising a cover part, a shutter mechanism opened and closed to expose successive sections of a filmstrip, and a film winding motor operable to wind each exposed section of the filmstrip into a film cartridge when said shutter mechanism is closed, is characterized in that:

a temporary motor defeat connected to said cover part prevents operation of said film winding motor when said shutter mechanism is closed, to allow said shutter mechanism to be tested without having to operate said film winding motor; and said cover part has a hole from which said temporary motor defeat projects to prevent operation of said film winding motor, but is removable from said hole to allow said film winding motor to be operated.

5. A method of testing a shutter mechanism in a one-time-use camera without having to operate a film winding motor in the camera, comprises the steps:

positioning a temporary motor defeat connected to a cover part in the camera to prevent operation of the film winding motor, to allow the shutter mechanism to be tested without having to operate the film winding motor; and withdrawing the temporary motor defeat from a hole in said cover part of the camera to allow the film winding motor to be-operated.

6. A method as recited in claim 5, wherein the cover part with the temporary motor defeat protruding inwardly from the hole in the cover part is assembled to a main body part to position the temporary motor defeat in the camera.

7. A method as recited in claim 6, wherein another cover part is assembled to the main body part to light-tightly shield an unexposed filmstrip in the main body part before the temporary motor defeat is withdrawn from the hole.

8. A method as recited in claim 5, wherein the temporary motor defeat is positioned in the camera to maintain a motor on/off switch opened in order to prevent operation of the film winding motor.

* * * * *